United States Patent
Wilson (10) Patent No.: US 6,676,129 B2
(45) Date of Patent: Jan. 13, 2004

(54) SUN VISOR ARM CONNECTION ASSEMBLY AND ARRANGEMENT

(75) Inventor: Douglas J. Wilson, Fort Gratiot, MI (US)

(73) Assignee: Lear Corporation, Southfield, MI (US)

( * ) Notice: Subject to any disclaimer, the term of this patent is extended or adjusted under 35 U.S.C. 154(b) by 39 days.

(21) Appl. No.: 09/833,997

(22) Filed: Apr. 12, 2001

(65) Prior Publication Data
US 2002/0149224 A1 Oct. 17, 2002

(51) Int. Cl.[7] .............................. B60J 3/00; H01R 33/00
(52) U.S. Cl. .................. 276/97.9; 296/97.5; 296/97.12; 439/34
(58) Field of Search ............................. 296/97.5, 97.9, 296/97.12; 439/34, 537; 248/27.3

(56) References Cited

U.S. PATENT DOCUMENTS

| | | | |
|---|---|---|---|
| 4,272,118 A | | 6/1981 | Viertel et al. |
| 4,362,907 A | * | 12/1982 | Polacsek |
| 4,363,511 A | | 12/1982 | Viertel et al. |
| 4,634,196 A | * | 1/1987 | Nestell |
| 4,720,132 A | | 1/1988 | Ebert et al. |
| 4,760,503 A | | 7/1988 | VandenBerge et al. |
| 5,076,634 A | | 12/1991 | Müler et al. |
| 5,143,678 A | | 9/1992 | Prillard |
| 5,186,644 A | * | 2/1993 | Pawlicki et al. ............... 439/34 |
| 5,188,446 A | | 2/1993 | Miller |
| 5,248,259 A | * | 9/1993 | Naito et al. ................... 439/34 |
| 5,299,106 A | | 3/1994 | Buchheit et al. |
| 5,320,399 A | * | 6/1994 | White et al. ............. 296/97.12 |
| 5,365,416 A | | 11/1994 | Peterson |
| 5,486,033 A | | 1/1996 | Lecorvaisier et al. |
| 5,498,056 A | | 3/1996 | Viertel et al. |
| 5,538,439 A | * | 7/1996 | Fell et al. ..................... 439/34 |
| 5,548,492 A | | 8/1996 | Hansen et al. |
| 5,637,010 A | | 6/1997 | Jost et al. |
| 5,890,792 A | | 4/1999 | Finn et al. |
| 5,906,424 A | | 5/1999 | Peterson |
| 6,036,500 A | * | 3/2000 | Francis et al. ................. 439/34 |
| 6,059,348 A | * | 5/2000 | Viertel et al. ............... 296/97.9 |
| 6,139,083 A | * | 10/2000 | Fischer et al. ............. 296/97.9 |
| 6,150,607 A | * | 11/2000 | Weyl et al. ................ 174/65 G |
| 6,159,019 A | * | 12/2000 | Norizuki et al. ............... 439/34 |
| 6,257,923 B1 | * | 7/2001 | Stone et al. .................... 439/34 |
| 6,340,193 B1 | * | 1/2002 | Sawayanagi ................ 296/97.9 |
| 6,368,114 B1 | * | 4/2002 | Inoue ........................... 439/34 |
| 6,382,697 B1 | * | 5/2002 | Mulder et al. ............. 296/97.9 |
| 6,398,173 B1 | * | 6/2002 | Sawayanagi ................ 296/97.9 |
| 6,406,087 B2 | * | 6/2002 | Sawayanagi ................ 296/97.9 |
| 6,428,077 B1 | * | 8/2002 | Sawayanagi ................ 296/97.9 |
| 2001/0007393 A1 | * | 7/2001 | Sawayanagi ................ 439/34 |
| 2001/0022336 A1 | * | 9/2001 | Sawayanagi ............. 296/97.12 |
| 2001/0025909 A1 | * | 10/2001 | Sawayanagi ................ 296/97.9 |

FOREIGN PATENT DOCUMENTS

EP          1 089 389 A2       4/2001

* cited by examiner

Primary Examiner—Joseph D. Pape
Assistant Examiner—Hilary Gutman
(74) Attorney, Agent, or Firm—Bill C. Panagos (57) ABSTRACT

A vehicle sun arm connection assembly and arrangement has a wire harness to which the assembly attaches. The assembly comprises a visor male connector and a visor female connector. The visor male connector has male conductive terminals separately attached to a first insulating body. The male conductive terminals and the first insulating body extend through a base. The visor female connector has a plurality of spaced female conductive terminals, each female terminal having an open port configured to engage a male conductive terminal. The female connector has a second insulating body disposed about the female terminals. The second insulating body has an open receiving end cooperable with the male connector.

9 Claims, 7 Drawing Sheets

SUN VISOR ARM CONNECTION ASSEMBLY AND ARRANGEMENT

BACKGROUND OF THE INVENTION

1. Field of the Invention

The present invention relates to a sun visor arm connection assembly for a vehicle having a wire harness to which the assembly attaches.

2. Background Art

Current sun visor assemblies typically include hollow arms, molded flexible wire inserts, molded rigid wire inserts, or a combination of both to transmit power from an overhead wire harness, and through the sun visor arm to a mirror visor light switch or other switch disposed in the assembly. The time and difficulty associated in assembling many current sun visors can be relatively significant.

Specifically, in the assembly of many current sun visors, it is advantageous for an installer to view the connection of the sun visor arm to the wire harness in order to visually confirm that a proper connection has been made. However, in such assemblies, such visual confirmation is associated with greater difficulty and time consumption simply due to the area encompassed by the vehicle headliner in the vehicle passenger compartment, which blocks the view of a connection between the assembly and the headliner. Thus, in many cases a blind connection must be made, which may create greater difficulty and require more time for assembly.

Moreover, sun visor arm assemblies having molded wire inserts extending through a hollow sun visor arm may experience electrical disconnection, due to continuous twisting of the arm during regular use of the sun visor. Many current sun visor assemblies have connections that become disconnected relatively easily during continuous use over a given time period.

Thus, there is a need to improve current sun visor assemblies in order to reduce the time and difficulty of assembly thereof. Also, there is a need to improve current sun visor assemblies for longer operation life.

SUMMARY OF THE INVENTION

It is an object of the present invention to provide a sun visor arm connection assembly that allows for a blind connection during installation thereof, and still reduces the time and difficulty of installing the assembly.

It is another object of the present invention to provide a sun visor arm connection assembly with longer operational life.

It is another object of the present invention to provide a sun visor arm connection assembly of a vehicle having a wire harness to which the assembly attaches. The assembly comprises a visor male connector and a visor female connector. The visor male connector has a plurality of male conductive terminals separably attached to a first insulating body. The male conductive terminals and the first insulating body extend through a base having a ring retainer slot formed thereon. The visor female connector has a plurality of spaced female conductive terminals, wherein each female terminal has an open port configured to engage one of the male conductive terminals. The female connector has a second insulating body disposed about the female terminals. The second insulating body has an open receiving end cooperable with the male connector, wherein the open receiving end has a ring formed thereon. The ring is received in the ring retainer slot to retain the ring in the slot to connect the male connector the female connector.

It is another object of the present invention to provide a sun visor arm arrangement of a vehicle having a wire harness. The arm arrangement comprises a plurality of conductive leads, each of which separably extends to a male conductive terminal. The leads are molded to a first insulating body. The conductive leads and the first insulating body are disposed within a molded sun visor arm for housing the conductive leads and the first insulating body. The sun visor arm assembly has a connection assembly for electrically connecting the leads to the wire harness. The connection assembly includes a male connector and a female connector. The male connector includes the male conductive terminal of each of the conductive leads, wherein the male conductive terminals are separably attached to the first insulating body. The male terminals and the first insulating body extend through a base having a ring retainer slot formed thereon. The female connector has a plurality of spaced female conductive terminals connected to the wire harness, wherein each female terminal has an open port configured to engage one of the male terminals. The female connector has a second insulating body disposed about the female terminals. The second insulating body has an open receiving end cooperable with the male connector. The receiving end has a ring formed thereon, wherein the ring complements the ring retainer slot to retain the ring in the slot for electrical connection of the conductive leads to the wire harness.

Another embodiment of the present invention includes a sun visor arm arrangement of a vehicle having a wire harness. The arm arrangement comprises a plurality of conductive leads, each of which separably extend to a female conductive terminal. The leads are molded to a first insulating body. The conductive leads and the first insulating body are disposed within a molded sun visor arm for housing the conductive leads and the first insulating body. The sun visor arm assembly has a connection assembly for electrically connecting the leads to the wire harness. The connection assembly includes a male connector and a female connector. The male connector has a plurality of male conductive terminals separably attached to a second insulating body. The male terminals and the second insulating body extend through a base having a ring retainer slot formed thereon. The female connector includes the female conductive terminals, each of which has an open port configured to engage the male terminals. The female connector has a first insulating body disposed about the female terminals. The first insulating body has an open receiving end cooperable with the male connector, wherein the receiving end has a ring formed thereon. The ring complements the ring retainer slot to retain the ring in the slot for connection of the male connector to the female connector.

Other objects, features, and advantages of the present invention will be apparent from the ensuing description in conjunction with the accompanying drawings.

DETAILED DESCRIPTION OF THE PREFERRED EMBODIMENT(S)

Figure 1:
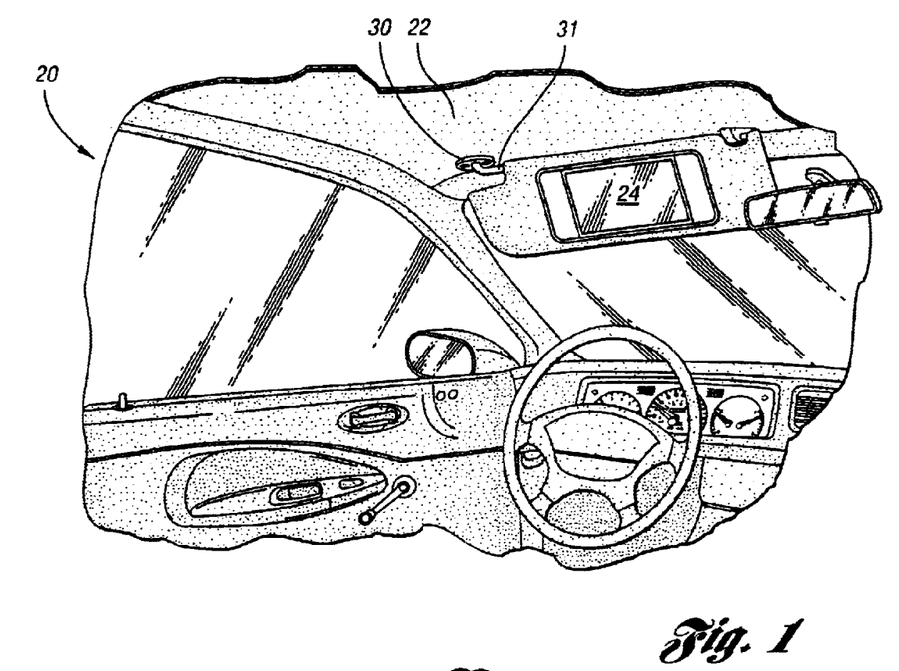
FIG. 1 is an environmental view of a vehicle having a sun visor arm connection assembly and arrangement in accordance with the present invention.

FIG. 1 illustrates vehicle 20 having headliner 22 and sun visor 24 mounted to headliner 22. Sun visor 24 incorporates sun visor arm connection assembly 30 in accordance with the present invention. Sun visor arm connection assembly 30 may connect to a wire harness (described below) above headliner 22 and may be connected to a vanity outlet (described below) which powers electrical switches in the sun visor, for example, a mirror light switch, garage door switch, or any other electrical switch. Sun visor arm connection assembly 30 is in sun visor arm 31.

Figure 2:
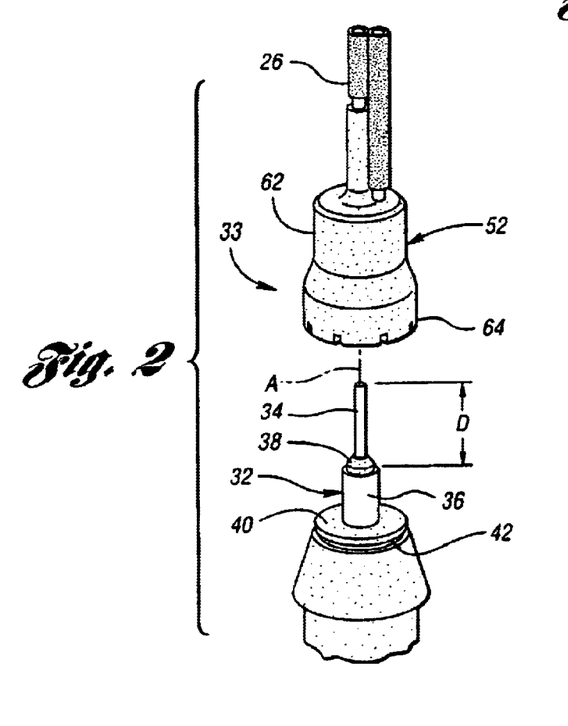
FIG. 2 is a side view depicting a co-axial sun visor connection assembly having a visor male connector and a visor female connector in accordance with the present invention.

FIG. 2 illustrates one embodiment of the sun visor arm connection assembly 30, as a co-axial sun visor arm connection assembly 33. Co-axial sun visor arm connection assembly 33 electrically connects to wire harness 26 having a plurality of wires to allow power to a sun visor switch. As shown, wire harness 26 includes electrical insulating material between the wires. Co-axial sun visor arm connection assembly 33 includes visor male connector 32 and visor female connector 52. Visor male connector 32 has first and second male conductive terminals 34, 36, which are separately attached to first insulating body 38. First and second male conductive terminals 34, 36 are preferably, but not necessarily, rigid. First and second male conductive terminals 34, 36 and first insulating body 38 extend through a base 40 having ring retainer slot 42 formed radially thereabout.

Figure 3:
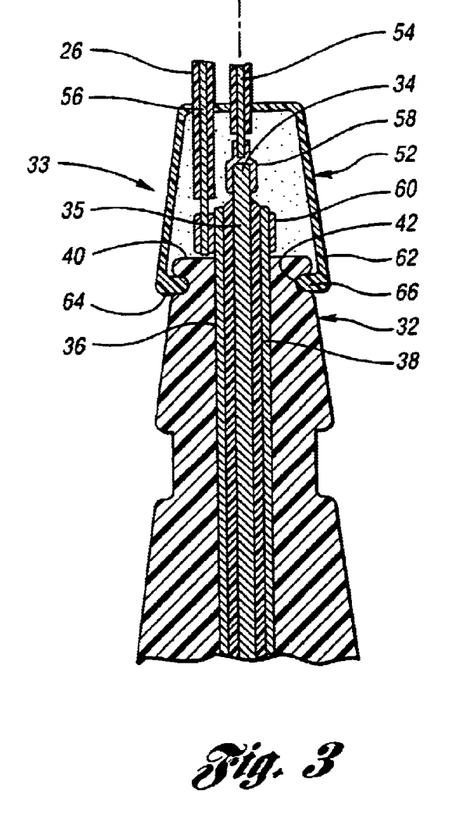
FIG. 3 is a side cross sectional view of the co-axial sun visor connection assembly of FIGS. 1 and 2.
Figure 4:
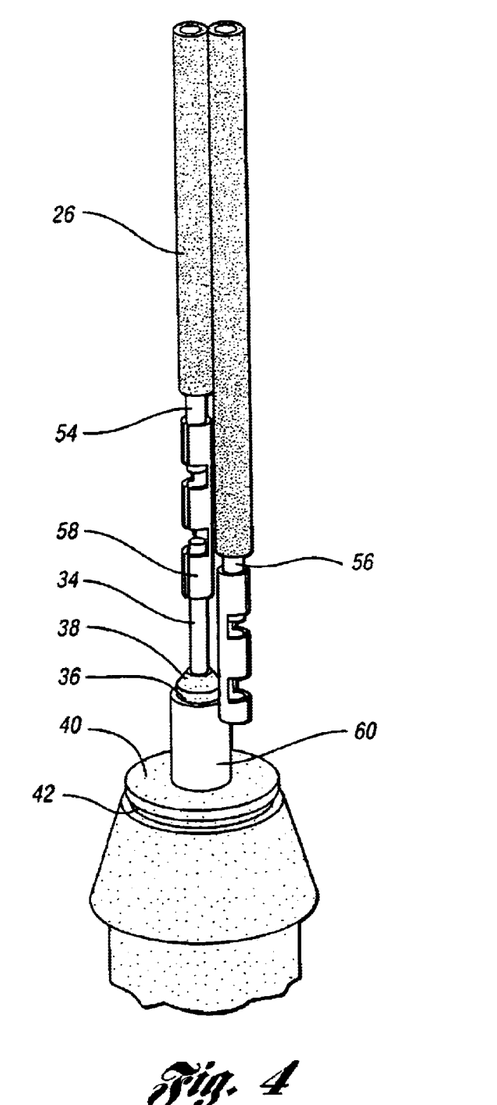
FIG. 4 is a side view of the visor male connector and the visor female connector without a second insulating body.

As shown in FIG. 3, first male conductive terminal 34 has a portion 35 about which second male conductive terminal 36 is disposed. First insulating body 38 is radially disposed between terminals 34 and 36 to separate electrically the two terminals. Second male conductive terminal 36 is radially disposed about first insulating body 38, which is radially disposed about portion 35 such that first and second terminals 34, 36 are in co-axial relationship about axis A. As shown, male connector 32 is configured such that first male conductive terminal 34 extends a distance D, further than second male conductive terminal 36. As can be seen in FIG. 4, this configuration allows first male conductive terminal 34 to be received in first open port 58 (described below).

First and second terminals 34, 36 may be comprised of conductive metal. For example, terminals 34, 36 may be made of conductive copper.

As shown in FIGS. 2–4, the visor female connector 52 has a first and second female conductive terminals 54, 56. Each of the female terminals 54, 56 has an open port configured to engage one of the male conductive terminals 34, 36. First female conductive terminal 54 has first open port 58, which engages first male conductive terminal 34. Second female conductive terminal 56 has second open port 60, which engages second male conductive terminal 36. As shown, ports 58, 60 are co-axially configured to accommodate the co-axial relationship of male conductive terminals 34, 36. Second open port 60 is larger than first open port 58. This allows first male conductive terminal 34 to fit through port 60 and engage port 58 for electrical connection. Upon electrical connection of terminal 34 and port 58, second male conductive terminal 36 engages port 60 for electrical connection thereto.

Female connector 52 further includes a second insulating body 62 disposed about and between the female terminals to electrically insulate the terminals and ports and to house the female terminals for receiving the male terminals. As shown, second insulating body 62 has open receiving end 64, which is cooperable with male connector 32. Open receiving end 64 has a ring 66 formed radially thereon, which is received in ring retainer slot 42 when engaged with male connector 32. Thus, male connector 32 is received in female connector 52 as receiving end 64 and ring 66 have dimensions which allow male connector to be retained therein. Also, ring 66 provides resistance in allowing base 40 to freely be inserted within second insulating body 62. As a result, male connector 32 connects to female connector 52 by snapping base 40 into second insulating body 62 such that ring 66 is retained within slot 42. Ring 66 is configured to have a snug fit within slot 42. Moreover, ring 66 provides resistance in allowing base 40 to freely be removed from second insulating body 62.

Figures 5, 6:
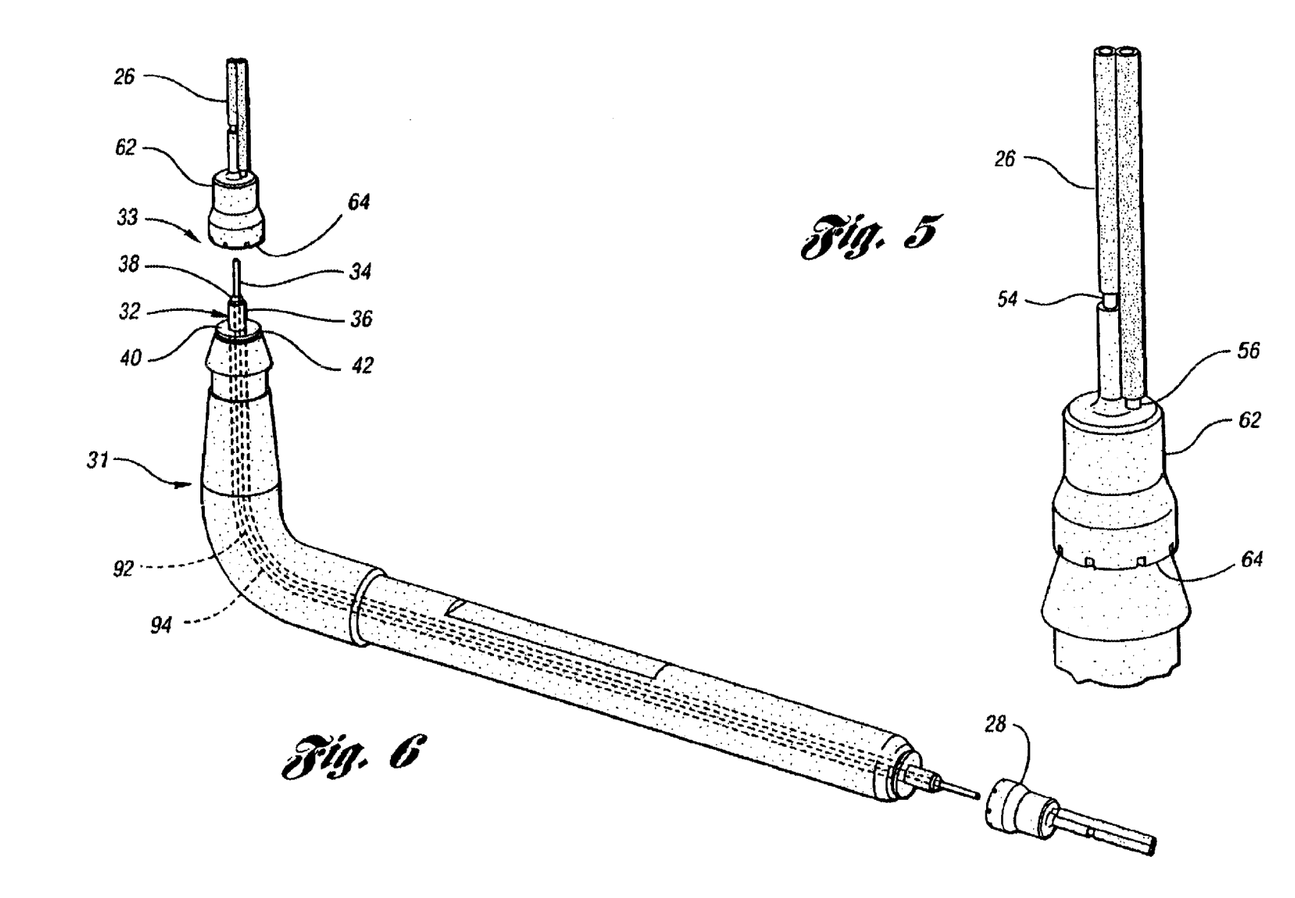
FIG. 5 is a side view of the visor male and female connectors with the second insulating body.
FIG. 6 is a perspective view of a sun visor arm arrangement having the sun visor arm connection assembly depicted in FIGS. 2–5 having a male connector.

As shown in FIGS. 3 and 4, first open port 58 complements and receives first male terminal 34 and second open port 60 complements and receives second male terminal 36. Thus, when male connector 32 is received and snapped into female connector 52, first open port 58 is electrically connected to first male conductive terminal 34, and second open port 60 is electrically connected to second male conductive terminal 36 as shown in FIGS. 3, 4, and 5. This provides electrical power to a vanity switch, e.g., a mirror light switch (not shown), disposed in the visor.

FIG. 6 illustrates sun visor arm arrangement 31 implementing sun visor arm connection assembly 33 described above. As shown, conductive leads 92, 94 are molded to first insulating body 38, wherein leads 92, 94 and first insulating body 38 extend within and along molded sun visor arrangement arm 31. Conductive leads 92, 94 and first insulating body 38 are housed within molded sun visor arrangement arm 31 as shown. Leads 92, 94 extend to first and second male conductive terminals 34, 36, respectively. As described in detail above, first and second male conductive terminals 34, 36 electrically connect to first and second open ports 58, 60, respectively. As shown, another sun visor arm connection assembly 33 may be implemented from the sun visor arrangement arm 31 in order to electrically connect to vanity outlet 28 to provide electrical power to a vanity switch such as a mirror light switch.

As shown in FIG. 6, the sun visor arm arrangement includes the visor male connector while the wire harness and vanity outlet include the visor female connectors. It is to be noted that such configuration of the male and female connectors may be interchanged both at the wire harness and at the vanity outlet. For clarity, FIG. 7 depicts a sun visor arm arrangement 80 having visor female connectors which electrically connect to visor male connectors of a wire harness.

Figures 7, 8:
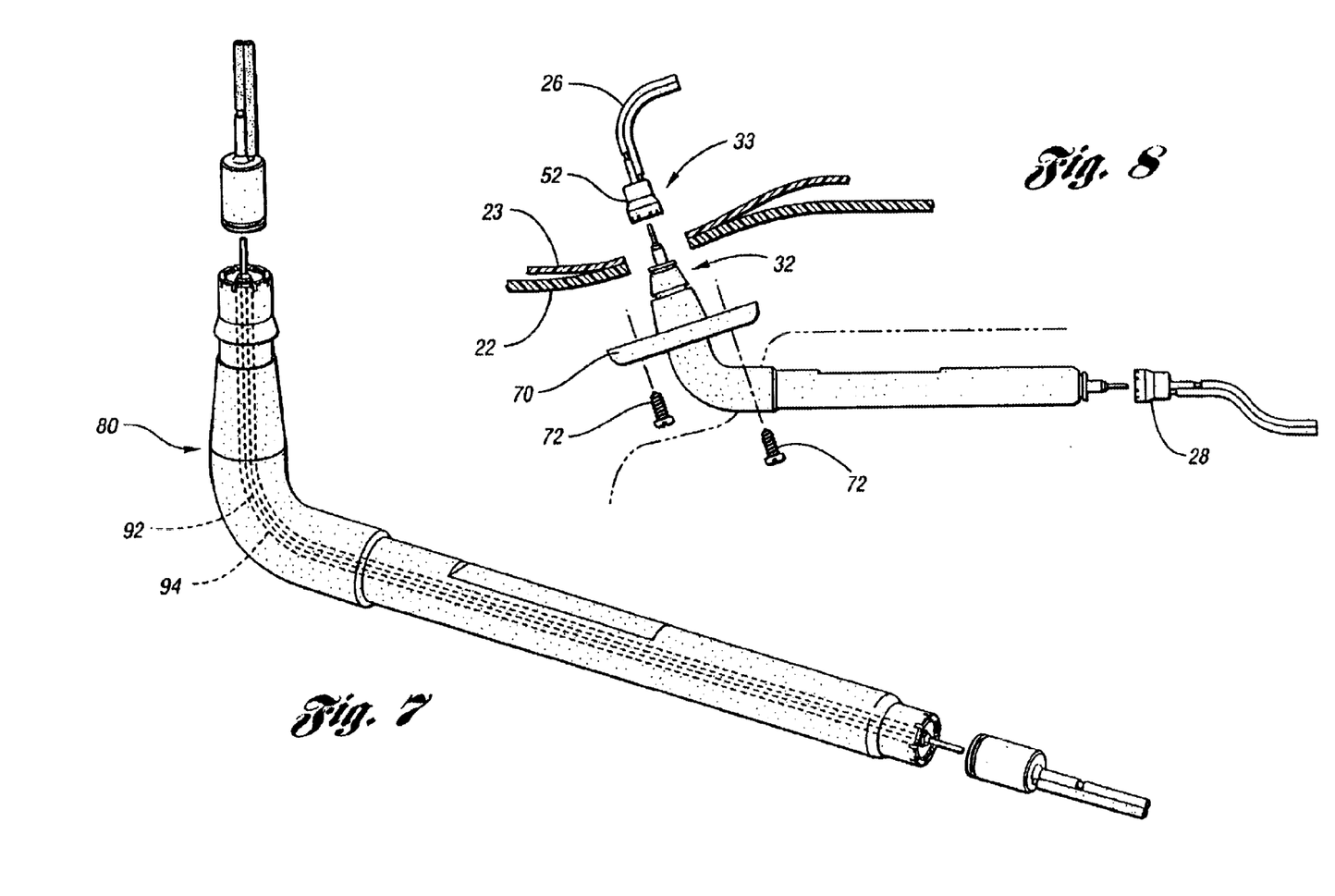
FIG. 7 is a perspective view of another embodiment of the sun visor arm arrangement having the co-axial sun visor arm connection assembly of FIG. 2–5 having a female connector.
FIG. 8 is a side view of the sun visor arm arrangement mounted to a headliner and sheet metal of a vehicle in which the arrangement is to be installed.

FIG. 8 depicts one example of mounting sun visor arm arrangement 31 having connection assembly 33 onto headliner 22 and sheet metal 23. As shown, arm arrangement 31 is disposed through mounting plate 70 and connects to visor female connector 52 for electrical connection to wire harness 26. Fastener screws 72 are then disposed through apertures (not shown) formed on plate 70 and inserted through headliner 22 and sheet metal 23. Sun visor arm arrangement 31 also attaches to vanity outlet 28 for electrical connection to a vanity switch (not shown).

Figure 9:
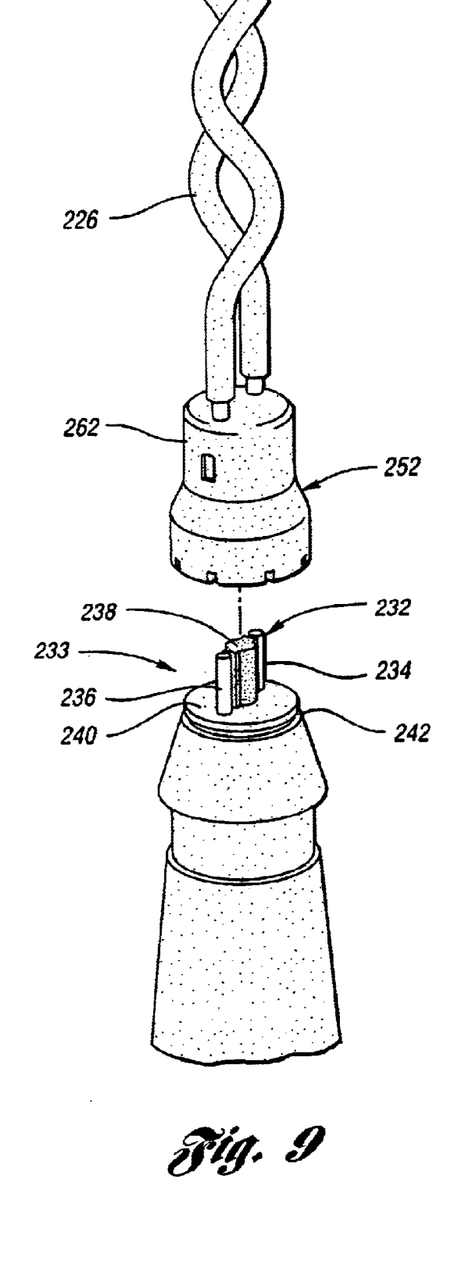
FIG. 9 is a side view of another embodiment of the sun visor arm connection assembly of FIG. 1.
Figure 10:
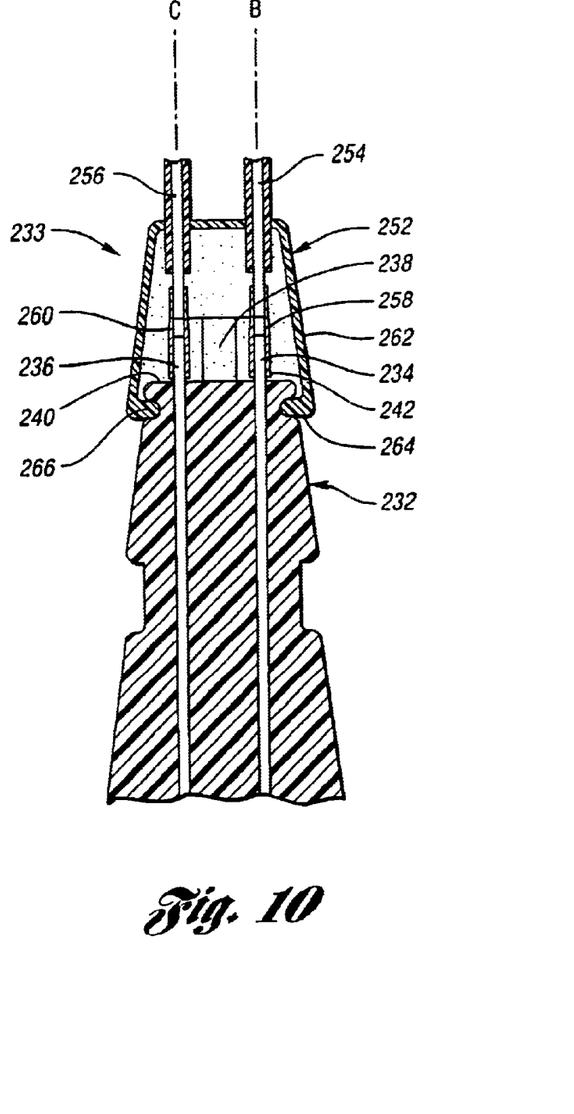
FIG. 10 is a side cross sectional view of the sun visor arm connection assembly having concurrent terminals in FIG. 9.

FIG. 9 illustrates another embodiment of a sun visor arm connection assembly in accordance with the present invention. Second sun visor arm connection assembly 233 electrically connects to wire harness 226 to allow power to a sun visor switch. Second sun visor arm connection assembly 233 includes visor male connector 232 and visor female connector 252. Visor male connector 232 has a plurality of male conductive terminals, which run substantially parallel to each other on different axes. First and second male conductive terminals 234, 236 separately attach to first insulating body 238. As shown, first and second male conductive terminals 234, 236 and first insulating body 238 both extend through a base 240 having ring retainer slot 242 formed thereon. As shown in FIGS. 9 and 10, first male conductive terminal 234 is attached to first insulating body 238. As shown, second male conductive terminal 236 is oppositely attached to first insulating body 238. Thus, first insulating body 238 is disposed between terminals 234 and 236 to electrically insulate the two terminals. First male conductive terminal 234 and second male conducive terminal 236 are concurrently attached to first insulating body 238 such that each terminal defines an axes B and C (FIG. 10) along which each runs, respectively.

Figures 11, 12:
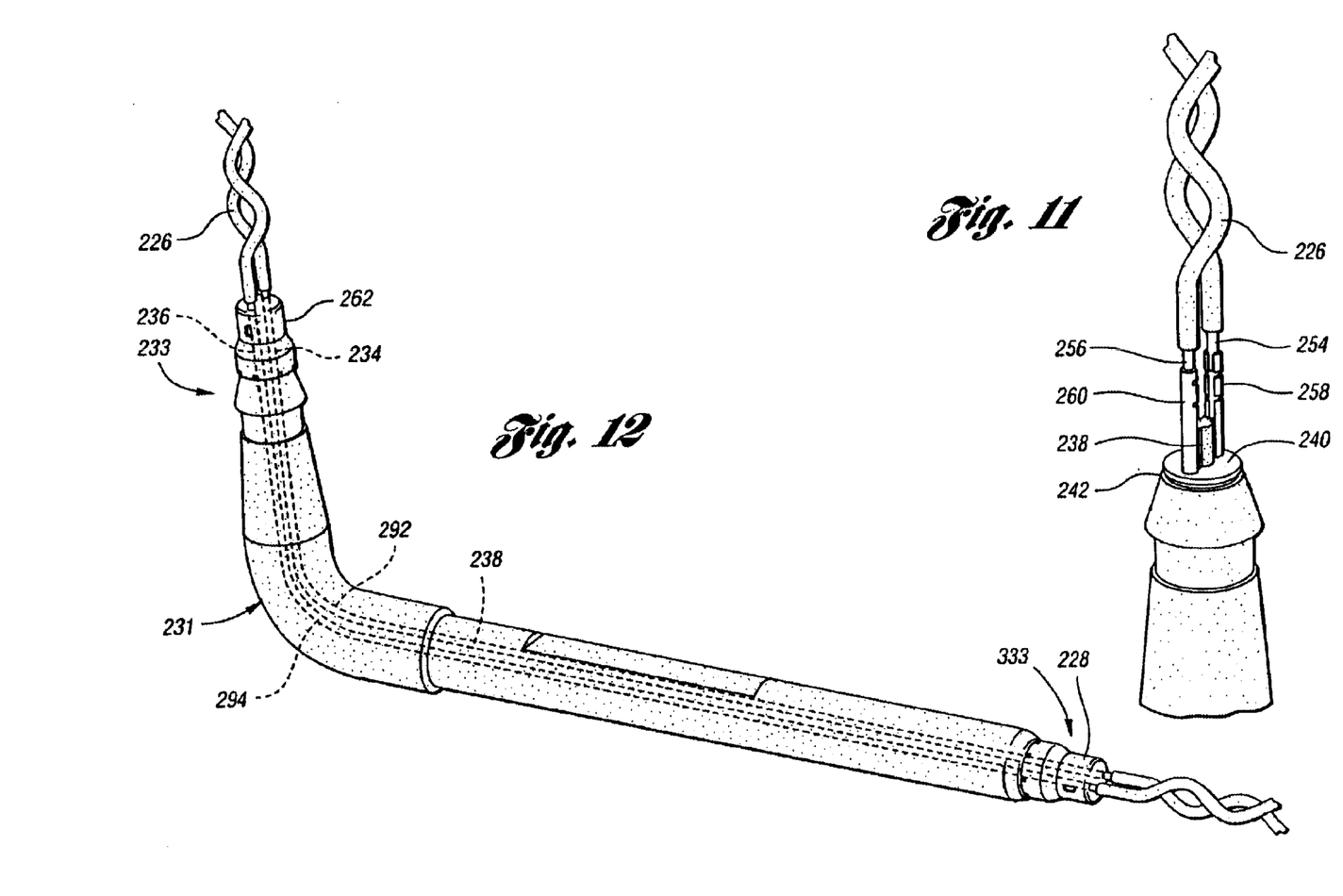
FIG. 11 is a side view of the sun visor connection assembly of FIG. 9 without a second insulating body.
FIG. 12 is a perspective view of a sun visor arm arrangement having the assembly depicted in FIGS. 9–11 having a male connector.

As shown in FIGS. 9–11, the visor female connector 252 also has a plurality of concurrently spaced female conductive terminals, first and second female conductive terminals 254, 256. Each of the female terminals 254, 256 has an open port configured to engage one of the male conductive terminals 234, 236. First female conductive terminal 254 has first open port 258, which engages first male conductive terminal 234. Second female conductive terminal 256 has second open port 260 which engages second male conductive terminal 236. As shown, ports 254, 260 are concurrently configured to accommodate the parallel or concurrent relationship of male conductive terminals 234, 236.

Female connector 252 further includes a second insulating body 262 disposed about and between the female terminals to electrically insulate the terminals and to house the terminals in receiving fashion. As shown, second insulating body 262 has open receiving end 264 which is cooperable with male connector 232. Open receiving end 264 has a ring 266 formed thereon which is received in ring retainer slot 242 when engaged with male connector 232. The connection of male connector 232 to female connector 252 is similar to the connection of male connector 32 to female connector 52 as described above.

As shown in FIGS. 10 and 11, first open port 258 complements and receives first male terminal 234 and second open port 260 complements and receives second male terminal 236. Thus, when male connector 232 is received and snapped into female connector 252, first open port 258 is electrically connected to first male conductive terminal 234, and second open port 260 is electrically connected to second male conductive terminal 236 as shown in FIGS. 10 and 12.

FIG. 12 illustrates sun visor arm arrangement 231 corresponding to sun visor arm connection assembly 233 described above. As shown, conductive leads 292, 294 are molded to first insulating body 238, wherein leads 292, 294 and first insulating body 238 extend within molded sun visor arm arrangement 231. Conductive leads 292, 294 and first insulating body 238 are housed within molded sun visor arm arrangement 231 as shown. Leads 292, 294 separably extend to concurrent first and second male conductive terminals 234, 236, respectively. As described in detail above, first and second male conductive terminals 234, 236 electrically connect to first and second open ports 258, 260, respectively. As shown, another sun visor arm connection assembly 333 may be implemented within sun visor arm arrangement 231 in order to electrically connect to vanity outlet 228 to provide electrical power to a vanity switch such as a mirror light switch.

Figure 13:
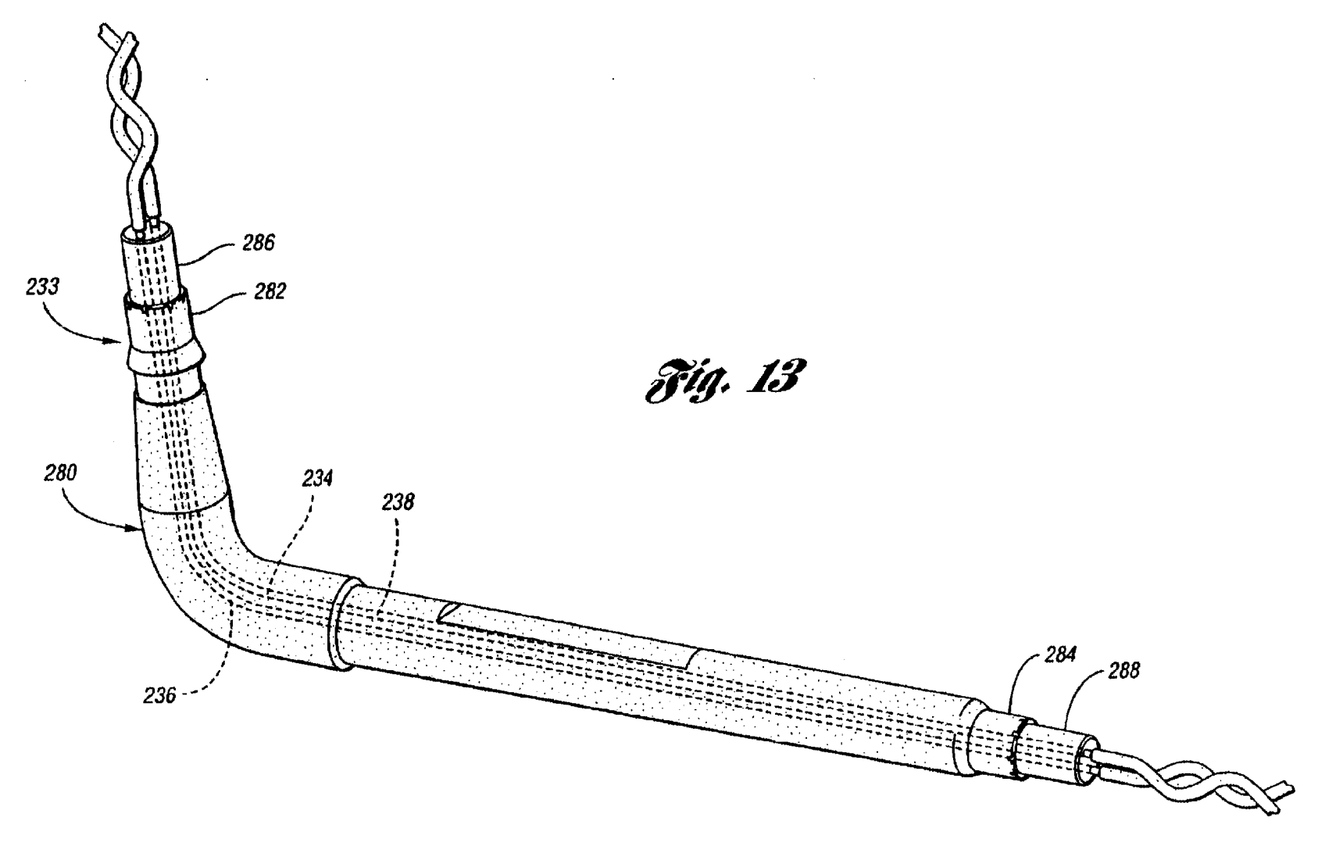
FIG. 13 is a view of another embodiment of the sun visor arm arrangement shown in FIG. 12 having a female connector.

As shown in FIG. 12, the sun visor arm arrangement 231 includes the visor male connector while the wire harness and vanity outlet includes the visor female connectors. It is to be noted that such configuration of the male and female connectors may be interchanged both at the wire harness and at the vanity outlet. For clarity, FIG. 13 depicts a sun visor arm arrangement 280 having visor female connectors 282, 284 which electrically connect to visor male connectors 286, 288. Additionally, any other configuration of the connectors on the sun visor arm arrangement does not fall beyond the scope or spirit of the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A sun visor arm connection assembly of a vehicle having a wire harness to which the assembly attaches, the assembly comprising:

a visor male connector having a plurality of male conductive terminals separably attached to a first insulating body, the male conductive terminals and the first insulating body extending through a base having a ring retainer slot formed thereon; and a visor female connector having a plurality of spaced female conductive terminals, each said female terminal having an open port configured to engage one of the male conductive terminals, the female connector having a second insulating body disposed about the female terminals, the second insulating body having an open receiving end cooperable with the male connector, the open receiving end having a ring formed thereon, the ring received in the ring retainer slot to retain the ring in the slot to connect the male connector to the female connector;

wherein the plurality of the male conductive terminals includes a first male conductive terminal having a portion about which a second male conductive terminal is co-axially disposed and wherein the first insulating body is disposed between the first and second male conductive terminals to separate the second male conductive terminal from the portion of the first male conductive terminal.

2. The assembly of claim 1 wherein the plurality of female conductive terminals includes first and second female conductive terminals having respective first and second open ports that are each configured to conductively engage one of the male conductive terminals.

3. The assembly of claim 2 wherein the first open port is configured to engage the first male terminal and the second open port is configured to engage the second male terminal.

4. The assembly of claim 2 wherein the first port is configured to receive the first male terminal and the second open port is configured to receive the second male terminal.

5. The assembly of claim 1 wherein the portion of the first male conductive terminal extends a calibrated distance from the second male conductive terminal.

6. The assembly of claim 1 wherein the ring retainer slot is formed circumferentially about the base and the ring is formed circumferentially on the open receiving end.

7. The assembly of claim 1 wherein the male and female conductive terminals are rigid.

8. The assembly of claim 1 wherein the male conductive terminals are integral to the first insulating body.

9. A sun visor arm connection assembly comprising:

a visor male connector having multiple male conductive terminals attached to a first insulating body, the male conductive terminals and the first insulating body extending through a base having a ring retainer slot formed thereon; and a visor female connector having multiple spaced female conductive terminals, each of the female conductive terminals having an open port configured to engage one of the male conductive terminals, the female connector having a second insulating body disposed about the female conductive terminals, the second insulating body having an open receiving end cooperable with the male connector, the open receiving end having a ring formed thereon, the ring being receivable in the ring retainer slot to retain slot to retain the ring in the slot to connect the male connector to the female connector;

wherein the male conductive terminals and the first insulating body extend beyond the base such that the male conductive terminals are visible when the visor male connector is viewed from a side.

* * * * *

UNITED STATES PATENT AND TRADEMARK OFFICE
CERTIFICATE OF CORRECTION

PATENT NO. : 6,676,129 B2
DATED : January 13, 2004
INVENTOR(S) : Douglas J. Wilson It is certified that error appears in the above-identified patent and that said Letters Patent is hereby corrected as shown below:

<u>Column 6,</u>
Line 41, delete "of" insert therefor -- for use with --.
Line 42, delete "attaches" insert therefor -- is attachable --.

Signed and Sealed this

Twenty-second Day of June, 2004

JON W. DUDAS
*Acting Director of the United States Patent and Trademark Office*